United States Patent
Nakaoka

(10) Patent No.: US 7,879,266 B2
(45) Date of Patent: *Feb. 1, 2011

(54) COMPOSITE CARBONATE AND METHOD FOR PRODUCING THE SAME

(75) Inventor: Yasuhiro Nakaoka, Tokyo (JP)

(73) Assignee: Nippon Chemical Industrial Co., Ltd., Tokyo (JP)

(*) Notice: Subject to any disclaimer, the term of this patent is extended or adjusted under 35 U.S.C. 154(b) by 105 days.

This patent is subject to a terminal disclaimer.

(21) Appl. No.: 12/362,978

(22) Filed: Jan. 30, 2009

(65) Prior Publication Data

US 2009/0197173 A1 Aug. 6, 2009

(30) Foreign Application Priority Data

Feb. 1, 2008 (JP) ............... 2008-022629

(51) Int. Cl.
*H01B 1/06* (2006.01)
(52) U.S. Cl. ................. 252/521.2; 423/420.2
(58) Field of Classification Search ............ 252/521.2; 423/420.2; 429/223
See application file for complete search history.

(56) References Cited

U.S. PATENT DOCUMENTS

| 2008/0219911 A1* | 9/2008 | Sun et al. ............ 423/420.2 |
| 2009/0226811 A1* | 9/2009 | Nakaoka ............ 429/223 |
| 2010/0117025 A1* | 5/2010 | Takeuchi et al. ...... 252/182.1 |

FOREIGN PATENT DOCUMENTS

| JP | 2001-148249 A | 5/2001 |
| JP | 2006-117517 A | 5/2006 |

* cited by examiner

*Primary Examiner*—Mark Kopec
(74) *Attorney, Agent, or Firm*—Westerman, Hattori, Daniels & Adrian, LLP

(57) ABSTRACT

The present invention provides a nickel atom-, manganese atom- and cobalt atom-containing composite carbonate that is high in specific surface area and large in tap density, and useful as a raw material for producing a lithium nickel manganese cobalt composite oxide to be used in a positive electrode active material for use in a lithium secondary battery, and provides a method for industrially advantageously producing the composite carbonate. The composite carbonate includes nickel atoms, manganese atoms and cobalt atoms, and has an average particle size of 20 μm or more and 40 μm or less, a BET specific surface area of 50 to 130 m$^2$/g and a tap density of 1.7 g/ml or more.

2 Claims, 1 Drawing Sheet

COMPOSITE CARBONATE AND METHOD FOR PRODUCING THE SAME

BACKGROUND OF THE INVENTION

1. Field of the Invention

The present invention relates to a composite carbonate useful as a raw material for producing a lithium nickel manganese cobalt composite oxide to be used in a positive electrode active material for use in a lithium secondary battery and a method for producing the composite carbonate.

2. Description of the Related Art

Lithium cobaltate has hitherto been used as a positive electrode active material for a lithium secondary battery. However, lithium nickel manganese cobalt composite oxides low in cobalt content have been developed because cobalt is a rare metal.

In these years, there have been demanded batteries excellent in rapid charge properties to be used in electric automobiles and power tools such as electric tools. Although increase of the specific surface area of the positive electrode material is a technique to cope with rapid charge, lithium nickel manganese cobalt composite oxides having hitherto been developed are all small in specific surface area.

Most of conventional methods for synthesizing lithium nickel manganese cobalt composite oxides use as starting raw materials nickel manganese cobalt composite hydroxides; the raw materials are small in specific surface area, and consequently, lithium nickel manganese cobalt composite oxides obtained therefrom are also small in specific surface area.

On the other hand, methods using as starting raw materials nickel manganese cobalt composite carbonates have also been proposed. Proposed examples of the method for producing a nickel manganese cobalt composite carbonate include the following two methods: the method of Japanese Patent Laid-Open No. 2001-148249 (p. 7, p. 9) (Patent Document 1) in which a solution that contains sulfates of nickel, manganese and cobalt and an aqueous solution that contains ammonium bicarbonate are simultaneously or alternately added dropwise to a water-containing solution to conduct the reaction while the pH of the solution is being controlled to fall within a range from 6.5 to 8.5; and the method of Japanese Patent Laid-Open No. 2006-117517 (p. 7) (Patent Document 2) in which a solution that contains sulfates of nickel, manganese and cobalt and an aqueous solution that contains sodium carbonate are simultaneously added to a water-containing solution to conduct the reaction.

However, the composite carbonates obtained by the production methods disclosed in above-described Patent Documents 1 and 2 are 40 $m^2/g$ or more in the BET specific surface area as the case may be but are as small as less than 1.7 g/ml in tap density, and accordingly suffers from a problem that the lithium composite oxide produced by using the composite carbonate gives a low filling density of the positive electrode active material in an electrode fabricated with the composite carbonate. Thus, there has been demanded development of a nickel atom-, manganese atom- and cobalt atom-containing composite carbonate that is high in specific surface area and large in tap density, and useful as a raw material for producing a lithium nickel manganese cobalt composite oxide to be used in a positive electrode active material for use in a lithium secondary battery.

Accordingly, an object of the present invention is to provide a nickel atom-, manganese atom- and cobalt atom-containing composite carbonate that is high in specific surface area and large in tap density, and useful as a raw material for producing a lithium nickel manganese cobalt composite oxide to be used in a positive electrode active material for use in a lithium secondary battery, and to provide a method for industrially advantageously producing the composite carbonate.

SUMMARY OF THE INVENTION

In view of the above-described circumstances, the present inventors diligently conducted a great deal of study, and consequently, perfected the present invention by discovering that: in a method for producing a composite carbonate by obtaining the composite carbonate on the basis of a reaction conducted by adding a solution (solution A) that contains nickel ions, manganese ions and cobalt ions and a solution (solution B) that contains carbonate ions or hydrogen carbonate ions into a reaction vessel, while the reaction is being conducted by simultaneously and continuously adding the solution A and the solution B into the reaction vessel at a specific addition rate, a slurry that contains the produced composite carbonate is collected by making the slurry overflow from the reaction vessel, and in this way, a composite carbonate that has a specific average particle size and is higher both in specific surface area and in tap density than conventional composite carbonates is obtained; the lithium nickel manganese cobalt composite oxide obtained by using the thus obtained composite carbonate as the raw material for producing the composite oxide is high both in specific surface area and in tap density; and a lithium secondary battery that uses the composite oxide as the positive electrode active material exhibits excellent battery performance.

Specifically, an aspect (1) of the present invention is the provision of a composite carbonate, wherein the composite carbonate includes nickel atoms, manganese atoms and cobalt atoms, and has an average particle size of 20 μm or more and 40 μm or less, a BET specific surface area of 50 to 130 $m^2/g$ and a tap density of 1.7 g/ml or more.

Additionally, an aspect (2) of the present invention is the provision of a method for producing a composite carbonate, by obtaining the composite carbonate on the basis of a reaction conducted by adding a solution (solution A) that contains nickel ions, manganese ions and cobalt ions and a solution (solution B) that contains carbonate ions or hydrogen carbonate ions into a reaction vessel, wherein:

while the reaction is being conducted by simultaneously and continuously adding the solution A and the solution B into the reaction vessel, the composite carbonate is obtained by collecting the slurry that contains the deposited composite carbonate by making the slurry overflow from the reaction vessel;

(D1) the addition rates of the nickel ions, the manganese ions and the cobalt ions contained in the solution A, are each 0.1 mol/hour-liter or less, in terms of atom, per 1 L of the reaction solution, and the addition rate of the carbonate ions or the hydrogen carbonate ions contained in the solution B is 0.5 mol/hour-liter or less, in terms of $CO_3$, per 1 L of the reaction solution; and (D2) the ratio of the addition amount, in terms of $CO_3$, of the carbonate ions or the hydrogen carbonate ions to the total addition amount, in terms of atom, of the nickel ions, manganese ions and cobalt ions is 2 to 10 in molar ratio.

According to the present invention, there can be provided a nickel atom-, manganese atom- and cobalt atom-containing composite carbonate that is high in specific surface area and large in tap density, and useful as a raw material for producing a lithium nickel manganese cobalt composite oxide to be used in a positive electrode active material for use in a lithium secondary battery, and there can be provided a method for industrially advantageously producing the composite carbonate. Additionally, a lithium nickel manganese cobalt composite oxide high both in specific surface area and in tap density can be obtained by using the composite carbonate of the present invention as a raw material for producing the composite oxide. Yet additionally, a lithium secondary battery that uses the composite oxide as a positive electrode active material exhibits excellent battery performance, in particular, excellent load property.

DETAILED DESCRIPTION OF THE PREFERRED EMBODIMENTS

Figure 1:
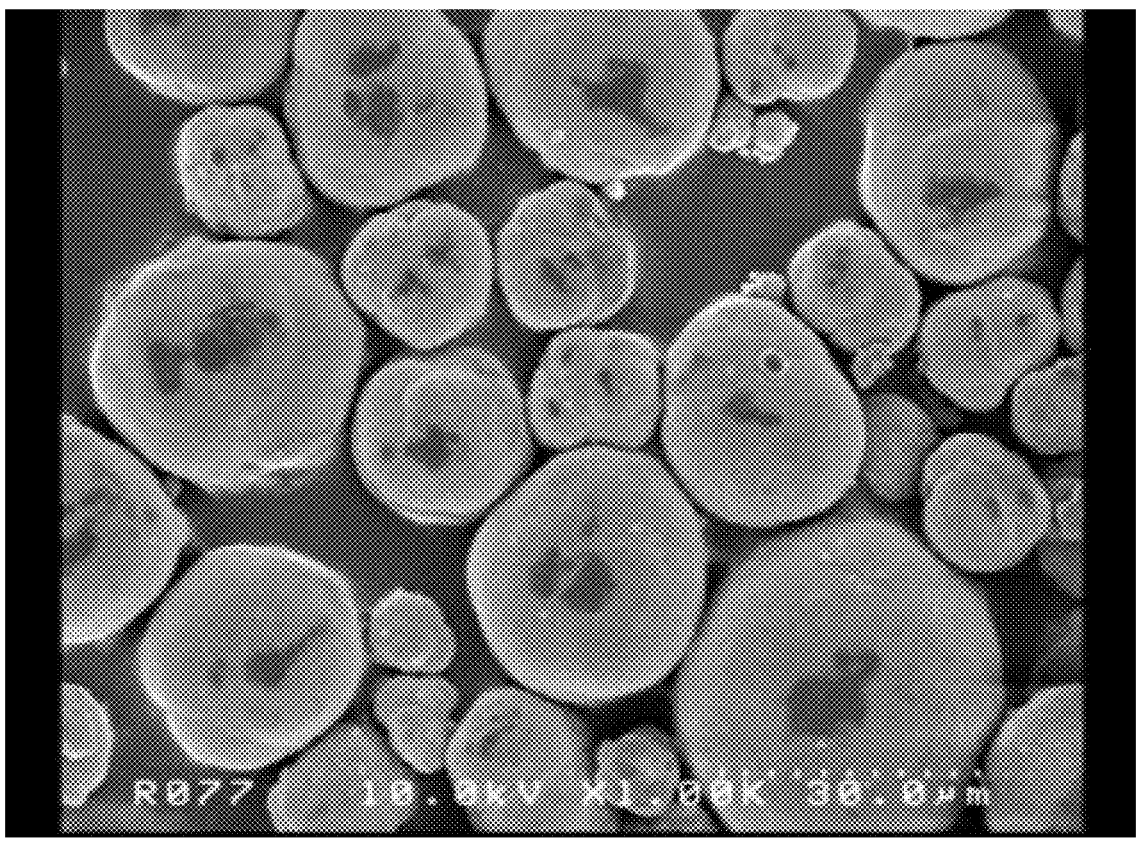
FIG. 1 is an electron micrograph of a composite carbonate obtained in Example 1.

Hereinafter, the present invention is described on the basis of the preferred embodiments thereof.

The composite carbonate of the present invention is a composite carbonate that contains nickel atoms, manganese atoms and cobalt atoms, and has an average particle size of 20 µm or more and 40 µm or less, a BET specific surface area of 50 to 130 m$^2$/g and a tap density of 1.7 g/ml or more.

The composite carbonate of the present invention is a composite carbonate that contains nickel atoms, manganese atoms and cobalt atoms. In the composite carbonate of the present invention, the ratio of the content of the nickel atoms to the content of the manganese atoms is, in terms of the molar ratio of the nickel atom content to the manganese atom content (Ni:Mn), preferably 1:0.5 to 2.0, particularly preferably 1:0.9 to 1.1 and further preferably 1:0.95 to 1.05. Also in the composite carbonate of the present invention, the ratio of the content of the nickel atoms to the content of the cobalt atoms is, in terms of the molar ratio of the nickel atom content to the cobalt atom content (Ni:Co), preferably 1:0.5 to 2.0, particularly preferably 1:0.9 to 1.1 and further preferably 1:0.95 to 1.05. When the ratio of the content of the manganese atoms to the content of the nickel atoms is less than the above-described range, the content of manganese that is an element low in price becomes low to tend to be uneconomical, and on the other hand, when exceeds the above-described range, the tap density tends to be low. Also when ratio of the content of the cobalt atoms to the content of the nickel atoms is less than the above-described range, the tap density tends to be low, and on the other hand, when exceeds the above-described range, the content of high price cobalt becomes large to tend to be uneconomical.

The average particle size of the composite carbonate of the present invention is 20 µm or more and 40 µm or less and preferably 20 to 30 µm in terms of the average particle size obtained by a laser particle size distribution measurement method.

One of the features of the composite carbonate of the present invention is the high specific surface area thereof. Specifically, the BET specific surface area of the composite carbonate of the present invention is 50 to 130 m$^2$/g and preferably 60 to 130 m$^2$/g. The BET specific surface area of the composite carbonate of the present invention falling within the above-described range yields a lithium nickel manganese cobalt composite oxide high in specific surface area, and consequently enables to improve the battery performance, in particular, the load property of a lithium secondary battery.

The tap density of the composite carbonate of the present invention is 1.7 g/ml or more and preferably 1.75 to 1.85 g/ml.

The tap density of the composite carbonate of the present invention falling within the above-described range yields a lithium nickel manganese cobalt composite oxide high in tap density, hence makes excellent the filling property of the composite oxide, and consequently enables to improve the battery performance, in particular, the volume energy density of a lithium secondary battery, and additionally enables the mass production of a lithium nickel manganese cobalt composite oxide.

It is to be noted that the tap density as referred to in the present invention is defined as a value derived by a tap method on the basis of the apparent density or apparent specific volume method described in JIS-K-5101 as follows: 5 g of a sample is placed in a 5-ml graduated cylinder, tapped 500 times and allowed to stand still, then the volume of the sample is read off and the tap density is derived from the following calculation formula:

$$\text{Tap density (g/ml)} = F/V$$

wherein F represents the mass (g) of the treated sample in the graduated cylinder and V represents the volume (ml) of the sample after tapping.

Next, the method for producing a composite carbonate of the present invention is described. The method for producing a composite carbonate of the present invention is a method for producing a composite carbonate, by obtaining the composite carbonate on the basis of a reaction conducted by adding a solution (solution A) that contains nickel ions, manganese ions and cobalt ions and a solution (solution B) that contains carbonate ions or hydrogen carbonate ions into a reaction vessel, wherein:

while the reaction is being conducted by simultaneously and continuously adding the solution A and the solution B into the reaction vessel, the composite carbonate is obtained by collecting the slurry that contains the deposited composite carbonate by making the slurry overflow from the reaction vessel;

(D1) the addition rates of the nickel ions, the manganese ions and the cobalt ions contained in the solution A, are each 0.1 mol/hour-liter or less, in terms of atom, per 1 L of the reaction solution, and the addition rate of the carbonate ions or the hydrogen carbonate ions contained in the solution B is 0.5 mol/hour-liter or less, in terms of $CO_3$, per 1 L of the reaction solution; and (D2) the ratio of the addition amount, in terms of $CO_3$, of the carbonate ions or the hydrogen carbonate ions to the total addition amount, in terms of atom, of the nickel ions, manganese ions and cobalt ions is 2 to 10 in molar ratio.

The method for producing a composite carbonate of the present invention is a method for producing a composite carbonate wherein the composite carbonate is obtained by conducting the reaction by adding the solution A and the solution B into the reaction vessel.

The solution A involved in the method for producing a composite carbonate of the present invention is a solution that contains nickel ions, manganese ions and cobalt ions. Additionally, the anions contained in the solution A are not particularly limited; examples of such anions include chloride ion, sulfate ion and nitrate ion.

The nickel source, manganese source and cobalt source for the solution A are not particularly limited; the solution A is obtained by dissolving in water, for example, a nickel salt, a manganese salt and a cobalt salt. The nickel salt involved in the solution A is not particularly limited as long as the nickel salt is water-soluble to yield a nickel ion-containing aqueous solution; examples of the nickel salt include the sulfate salt, the chloride salt, the nitrate salt and the acetate salt of nickel. Additionally, the manganese salt involved in the solution A is not particularly limited as long as the manganese salt is water-soluble to yield a manganese ion-containing aqueous solution; examples of the manganese salt include the sulfate salt, the chloride salt, the nitrate salt and the acetate salt of manganese. Additionally, the cobalt salt involved in the solution A is not particularly limited as long as the cobalt salt is water-soluble to yield a cobalt ion-containing aqueous solution; examples of the cobalt salt include the sulfate salt, the chloride salt, the nitrate salt and the acetate salt of cobalt. Among these salts, the sulfate salts and the chloride salts are preferable because of being economical. In the solution A, the nickel salt involved in the solution A may include two or more types of nickel salts different in anion from each other, the manganese salt involved in the solution A may include two or more types of manganese salts different in anion from each other, and the cobalt salt involved in the solution A may include two or more types of cobalt salts different in anion from each other.

In the solution A, the content of nickel ions in terms of nickel atom is preferably 0.1 to 2.0 mol/L and particularly preferably 0.5 to 2.0 mol/L, the content of manganese ions in terms of manganese atom is preferably 0.1 to 2.0 mol/L and particularly preferably 0.5 to 2.0 mol/L, and the content of cobalt ions in terms of cobalt atom is preferably 0.1 to 2.0 mol/L and particularly preferably 0.5 to 2.0 mol/L. The contents of the nickel ions, the manganese ions and the cobalt ions in the solution A respectively falling within the above-described ranges enable to reduce the amount of the waste solution left after the reaction preferably from the viewpoint of being industrially advantageous.

Additionally, in the solution A, the ratio of the content of the nickel ions to the content of the manganese ions is, in terms of the molar ratio of the nickel atom content to the manganese atom content (Ni:Mn), preferably 1:0.5 to 2.0, particularly preferably 1:0.9 to 1.1 and further preferably 1:0.95 to 1.05. Also in the solution A, the ratio of the content of the nickel ions to the content of the cobalt ions is, in terms of the molar ratio of the nickel atom content to the cobalt atom content (Ni:Co), preferably 1:0.5 to 2.0, particularly preferably 1:0.9 to 1.1 and further preferably 1:0.95 to 1.05. The molar ratio in the solution A between the nickel atom content, manganese atom content and cobalt atom content falling within the above-described range further enhances the effects to increase the specific surface area and the tap density of the composite carbonate.

The solution B involved in the method for producing a composite carbonate of the present invention is a solution that contains either carbonate ions or hydrogen carbonate ions, or both carbonate ions and hydrogen carbonate ions. The solution B is obtained by dissolving in water, for example, a carbonate or a hydrogen carbonate. The carbonate source for the solution B is not particularly limited as long as the carbonate source is capable of being dissolved in water and yielding an aqueous solution that contains carbonate ions or hydrogen carbonate ions. Preferable examples of such a carbonate source include sodium hydrogen carbonate, potassium hydrogen carbonate, sodium carbonate, potassium carbonate, ammonium hydrogen carbonate and ammonium carbonate; particularly preferable among these is sodium hydrogen carbonate because sodium hydrogen carbonate does not contain ammonia, renders the pH of the reaction solution to be nearly neutral and is low in price. It is to be noted that the carbonate or the hydrogen carbonate involved in the solution B may also be two or more types of carbonates or hydrogen carbonates different in cation from each other.

In the solution B, the content of carbonate ions or hydrogen carbonate ions (the total content of carbonate ions and hydrogen carbonate ions when the solution B contains both carbonate ion and hydrogen carbonate ion), in terms of $CO_3$, is preferably 0.1 to 2.0 mol/L and particularly preferably 0.5 to 2.0 mol/L. The content of the carbonate ions or the hydrogen carbonate ions in the solution B falling within the above-described range enables to reduce the amount of the waste solution left after the reaction preferably from the viewpoint of being industrially advantageous.

The reaction vessel involved in the method for producing a composite carbonate of the present invention is not particularly limited as long as the reaction vessel is allowed to conduct the reaction in an overflow manner; examples of such a reaction vessel include a reaction vessel equipped with an overflow pipe connected to the side wall portion in the vicinity of the bottom of the vessel.

In the method for producing a composite carbonate of the present invention, while the reaction is being conducted by simultaneously and continuously adding the solution A and the solution B into the reaction vessel under the conditions satisfying the above-described (D1) and (D2), the composite carbonate is obtained by collecting the slurry that contains the produced composite carbonate by making the slurry overflow from the reaction vessel.

The condition (D1) is the condition in which all the addition rates of the nickel ions, the manganese ions and the cobalt ions contained in the solution A, are each 0.1 mol/hour-liter or less, in terms of atom, per 1 L of the reaction solution, and the addition rate of the carbonate ions or the hydrogen carbonate ions contained in the solution B is 0.5 mol/hour-liter or less, in terms of $CO_3$, per 1 L of the reaction solution. Hereinafter, the addition rate of the nickel ions contained in the solution A per 1 L of the reaction solution is also described as the addition rate A1, the addition rate of the manganese ions contained in the solution A per 1 L of the reaction solution is also described as the addition rate A2, the addition rate of the cobalt ions contained in the solution A per 1 L of the reaction solution is also described as the addition rate A3, and the addition rate of the carbonate ions or the hydrogen carbonate ions contained in the solution B per 1 L of the reaction solution is also described as the addition rate B. In (D1), any of the addition rate A1, the addition rate A2 and the addition rate A3, in terms of atom, is preferably 0.01 to 0.08 mol/hour-liter. Also in (D1), the addition rate B, in terms of $CO_3$, is preferably 0.35 to 0.45 mol/hour-liter.

The addition rate A1 is the addition rate of the number of moles of the nickel atoms representing the number of moles of the nickel ions in terms of atom, and also is the addition rate expressed per 1 L of the reaction solution. Similarly, the addition rate A2 is the addition rate of the number of moles of the manganese atoms representing the number of moles of the manganese ions in terms of atom, and also is the addition rate expressed per 1 L of the reaction solution. Also, similarly, the addition rate A3 is the addition rate of the number of moles of the cobalt atoms representing the number of moles of the cobalt ions in terms of atom, and also is the addition rate expressed per 1 L of the reaction solution. For example, the following case is described: the solution A in which the content of the nickel ions in terms of Ni atom is 0.9 mol/L, the content of the manganese ions in terms of Mn atom is 0.9 mol/L and the content of the cobalt ions in terms of Co atom is 0.9 mol/L is fed into a reaction vessel in which overflow occurs when the amount of the reaction solution exceeds 0.5 L, at a feed rate of 0.03 L/hour. In this case, into the reaction vessel, the solution A in which the concentration of any ion species is 0.9 mol/L is being fed. The feed rate of the solution A is 0.03 L/hour, and hence any of the addition rates of the nickel ions, the manganese ions and the cobalt ions added into the reaction vessel is 0.027 mol/hour (0.9×0.03). The amount of the reaction solution in the reaction vessel is 0.5 L, and hence, when expressed per 1 L, the addition rates of the nickel ions, the manganese ions and the cobalt ions contained in the solution A are each 0.054 mol/hour-liter (0.027×(1/0.5)) in relation to 1 L of the reaction solution.

The addition rate B is the addition rate of carbonate ions or hydrogen carbonate ions in terms of $CO_3$, and is also the addition rate expressed per 1 L of the reaction solution. It is to be noted that when the solution B contains both carbonate ions and hydrogen carbonate ions, the addition rate B is the addition rate of the total of the number of moles of carbonate ions and the number of moles of hydrogen carbonate ions both in terms of $CO_3$. For example, the following case is described: the solution B in which the content of carbonate ions in terms of $CO_3$ is 0.95 mol/L is fed into a reaction vessel in which overflow occurs when the amount of the reaction solution exceeds 0.5 L, at a feed rate of 0.2 L/hour. In this case, into the reaction vessel, the solution B in which the concentration is 0.95 mol/L in terms of $CO_3$ is being fed. The feed rate of the solution B is 0.2 L/hour, and hence the addition rate of the carbonate ions added into the reaction vessel is 0.19 mol/hour (0.95×0.2). The amount of the reaction solution in the reaction vessel is 0.5 L, and hence, when expressed per 1 L, the addition rate of the carbonate ions contained in the solution B is 0.38 mol/hour-liter (0.19×(1/0.5)) in relation to 1 L of the reaction solution.

Additionally, the condition (D1) is a condition in which the addition rate A1, the addition rate A2, the addition rate A3 and the addition rate B are all within the above-described ranges. When the condition (D1) is satisfied, dense spherical particles are obtained. On the other hand, when the condition (D1) is not satisfied, no dense spherical particles are obtained.

The condition (D2) is the condition in which the ratio ($CO_3$/(Ni+Mn+Co)) of the addition amount, in terms of $CO_3$, of the carbonate ions or the hydrogen carbonate ions to the total addition amount, in terms of atom, of the nickel ions, manganese ions and cobalt ions is 2 to 10 in molar ratio. It is to be noted that when the solution B contains both carbonate ions and hydrogen carbonate ions, the addition amount is based on the total of the number of moles of the carbonate ions and the number of moles of the hydrogen carbonate ions both in terms of $CO_3$. And in (D2), the ratio of the addition amount, in terms of $CO_3$, of the carbonate ions or the hydrogen carbonate ions to the total addition amount, in terms of atom, of the nickel ions, manganese ions and cobalt ions is preferably 3 to 8. When the condition (D2) is satisfied, a composite carbonate having the properties of the composite carbonate of the present invention is obtained. On the other hand, when the ratio ($CO_3$/(Ni+Mn+Co)) is less than the range of the condition (D2), the production rate of the composite carbonate becomes slow, and there occurs an adverse possibility that the unreacted metal ions flow toward outside the reaction vessel; and when the ratio ($CO_3$/(Ni+Mn+Co)) exceeds the range of the condition (D2), the amount of the unreacted carbonate ions becomes too large uneconomically.

In the method for producing a composite carbonate of the present invention, the solution A and the solution B are simultaneously and continuously added into a reaction vessel to conduct a reaction. In this case, the addition of the solution A and the solution B is conducted at a constant rate. The addition of the solution A and the solution B at a constant rate refers to the fact that the addition rate A and the addition rate B are controlled within a margin of ±30%.

Examples of the method for simultaneously and continuously adding into a reaction vessel include a method in which the solution A and the solution B are continuously dropwise added into a reaction vessel, and a method in which the solution A and the solution B are fed into a reaction vessel by using devices such as pumps in such a way that the addition of the solution A and the solution B is conducted continuously at a constant rate.

Additionally, when the addition of the solution A and the solution B is started, water is beforehand placed in the reaction vessel, and thus, the addition of the solution A and the solution B is started in relation to the reaction vessel with water beforehand placed therein. In the case where water is beforehand placed in the reaction vessel, the amount of water is appropriately selected according to the volume of the reaction vessel.

The temperature of the reaction solution in the reaction vessel, namely, the reaction temperature is maintained usually at 10 to 90° C. and preferably at 50 to 80° C. When the reaction temperature is lower than the above-described range, the reaction rate is decreased; when the reaction temperature exceeds the above-described range, excessive energy is uneconomically needed for heating. It is to be noted that the temperature of the reaction solution in the reaction vessel is controlled by the temperatures of the added solution A and the added solution B and the heating temperature of the reaction vessel.

The addition of the solution A and the solution B is preferably conducted under stirring of the reaction solution in the reaction vessel. The stirring rate in this addition is only required to be a rate ensuring the state of the slurry that contains the composite carbonate to exhibit fluidity, without being particularly limited; however, a tendency is such that the more rapid is the stirring rate, the higher the tap density of the obtained product.

In the method for producing a composite carbonate of the present invention, while the reaction is being conducted by adding the solution A and the solution B into the reaction vessel simultaneously and continuously, the composite carbonate is obtained by collecting the slurry that contains the produced composite carbonate by making the slurry overflow from the reaction vessel. In other words, the slurry that contains the composite carbonate is collected from the reaction vessel by the amount corresponding to the amount of the solution A and the solution B added into the reaction vessel.

In the method for producing a composite carbonate of the present invention, by adding the solution A and the solution B simultaneously and continuously into the reaction vessel, nickel ions, manganese ions and cobalt ions are reacted in the reaction vessel with carbonate ions or hydrogen carbonate ions to produce the composite carbonate to be deposited. The deposited composite carbonate is dispersed in the reaction solution to form a slurry that contains the composite carbonate. The solution A and the solution B are added continuously into the reaction vessel, and consequently the slurry that contains the composite carbonate is made to overflow continuously by an amount corresponding to the added total amount of the solution A and the solution B.

Thus, in the method for producing a composite carbonate of the present invention, the solution A and the solution B are simultaneously and continuously added into the reaction vessel, each at a constant rate, and hence the composite carbonate deposited, as a result of the reaction, stays in the reaction solution for a certain period of time and then is discharged toward outside the reaction vessel. In this discharge, the composite carbonate is discharged in the form of the slurry that contains the composite carbonate toward outside the reaction vessel, and hence ions such as the sulfate ion, the chloride ion and the sodium ion in the reaction solution are also discharged respectively at certain rates. Consequently, the respective ion concentrations in the reaction solution can be maintained to be constant, and hence production of coarse particles due to abnormal reactions can be suppressed. Consequently, the composite carbonate having a large specific surface area can be obtained.

In the method for producing a composite carbonate of the present invention, by regulating the average residence time of the composite carbonate, the particle growth of the composite carbonate can be controlled. The average residence time of the composite carbonate is preferably 3 hours or less and particularly preferably 0.5 to 3 hours. The average residence time of the composite carbonate falling within the above-described range facilitates the production of uniform particles. On the other hand, when the average residence time exceeds the above-described range, coarse particles tend to be produced and the particle size distribution tends to be broadened. It is to be noted that the average residence time of the composite carbonate means the time required for replacement of the whole amount of the reaction solution in the reaction vessel and is derived from the following formula: the amount of the reaction solution/(the addition rate (liter/hour) of the solution A+ the addition rate (liter/hour) of the solution B). The average residence time of the composite carbonate is appropriately regulated by selecting the volume of the reaction vessel, the addition rate of the solution A and the addition rate of the solution B.

In the method for producing a composite carbonate of the present invention, from the slurry that contains the composite carbonate, collected by overflowing from the reaction vessel, the solid content is separated by conducting solid-liquid separation in the usual manner, and where necessary, washed with water, dried, pulverized and classified to yield the composite carbonate.

The composite carbonate thus obtained by applying the method for producing a composite carbonate of the present invention includes nickel atoms, manganese atoms and cobalt atoms, and has an average particle size of 20 μm or more and 40 μm or less, preferably 20 to 30 μm, a BET specific surface area of 50 to 130 m$^2$/g, preferably 50 to 100 m$^2$/g, and a tap density of 1.7 g/ml or more, preferably 1.75 to 1.85 g/ml. Additionally, the molar ratio between the contents of the nickel atoms, the manganese atoms and the cobalt atoms in the composite carbonate is 1:0.5 to 2.0:0.5 to 2.0, preferably 1:0.9 to 1.1:0.9 to 1.1 and particularly preferably 1:0.95 to 1.05:0.95 to 1.05. Moreover, the composite carbonate obtained by applying the method for producing a composite carbonate of the present invention is substantially spherical.

The composite carbonate of the present invention is particularly useful as a raw material for producing a lithium nickel manganese cobalt composite oxide to be used as a positive electrode active material of a lithium secondary battery. Particularly preferable is a lithium nickel manganese cobalt composite oxide represented by the following general formula (1):

$$Li_xNi_{1-y-z}Mn_yCo_zO_2 \quad (1)$$

wherein x satisfies $0.9 \leq x \leq 1.3$, y satisfies $0 \leq y \leq 1.0$, preferably $0.45 \leq y \leq 0.55$, and z satisfies $0 < z < 1.0$, preferably $0.45 \leq z \leq 0.55$.

The lithium nickel manganese cobalt composite oxide represented by the above-described general formula (1) is produced by mixing the composite carbonate of the present invention with a lithium compound and by baking the thus obtained homogeneous mixture. Specifically, examples of the lithium compound include lithium carbonate and lithium hydroxide. The addition amount of the lithium compound is such that the ratio (Li/M) of the number of moles of the lithium atoms in the lithium compound to the total number of moles (M) of the nickel atoms, manganese atoms and cobalt atoms included in the composite carbonate is 0.8 to 1.3 and preferably 0.9 to 1.1. The baking conditions are such that the baking temperature is 500 to 1100° C., preferably 650 to 850° C. and the baking time is 2 hours or more, preferably 3 to 12 hours. The baking atmosphere is not particularly limited; the baking may be conducted in the atmosphere or in an oxygen atmosphere. It is to be noted that when raw materials to produce water are baked, the baking is preferably conducted in the atmosphere or in an oxygen atmosphere as a multiple-stage baking; preferably, the baking is conducted slowly within a temperature range from about 200 to 400° C. ensuring the removal of the water contained in the raw materials, preferably over a period of 1 to 10 hours, and thereafter, the baked material is rapidly heated to 650 to 850° C. to be baked further for 1 to 30 hours.

Additionally, the baking may be repeated unlimited times where necessary. Alternatively, for the purpose of ensuring uniform powder properties, a once baked material may be pulverized to be baked again.

After baking, by appropriately cooling, and by pulverizing and classifying where necessary, there can be obtained a lithium nickel manganese cobalt composite oxide that has a BET specific surface area as high as 0.5 m$^2$/g or more and a tap density as high as 1.7 g/ml or more. Such a lithium nickel manganese cobalt composite oxide is suitably used as a positive electrode active material of a lithium secondary battery.

EXAMPLES

Hereinafter, the present invention is described in detail with reference to Examples. However, the present invention is not limited to these Examples.

Example 1

Preparation of Solution A

In purified water, 139 g (0.58 mol) of nickel chloride hexahydrate, 116 g (0.58 mol) of manganese chloride tetrahydrate and 139 g (0.58 mol) of cobalt chloride hexahydrate were dissolved, and then the solution thus obtained was further diluted with purified water to 650 ml to prepare the solution A.

Preparation of Solution B

In purified water, 720 g (8.57 mol) of sodium hydrogen carbonate was dissolved, and the solution thus obtained was further diluted with purified water to 9 L to prepare the solution B.

The compositions of these solutions were as follows.
Solution A: Ni: 0.9 mol/L, Mn: 0.9 mol/L, Co: 0.9 mol/L, Cl: 5.4 mol/L
Solution B: CO$_3$: 0.95 mol/L, Na: 0.95 mol/L In a 300-ml overflow reaction vessel, 100 ml of purified water was placed, and while the reaction solution temperature was being maintained at 80° C. and the reaction solution was being stirred at 1200 rpm, the total amount of the solution A and the total amount of the solution B were simultaneously added dropwise into the reaction vessel by using pumps, each at a constant rate, over a period of 90 hours. At this case, the addition rates A (A1, A2 and A3) of the Ni ions, the Mn ions and the Co ions in relation to 1 L of the reaction solution were each 0.02 mol/hour-liter, and the addition rate B in relation to 1 L of the reaction solution was 0.32 mol/hour-liter. The ratio of the addition amount (8.57 mol), in terms of $CO_3$, of the hydrogen carbonate ions to the total addition amount (1.74 mol) of the Ni ions, Mn ions and Co ions was 4.9. The average residence time was 2.8 hours. About 10 kg of the slurry that overflowed from the reaction vessel was collected, and subjected to solid-liquid separation in the usual manner; the solid product thus obtained was dried at 50° C. for 12 hours, and lightly pulverized to yield 212 g of a powder product (yield: 103%). The thus obtained powder product was subjected to an XRD measurement and an ICP measurement to reveal that the powder product was a composite carbonate that contained nickel, manganese and cobalt in a molar ratio of 1.00:1.02:0.97.

Comparative Example 1

Preparation of Solution A

In purified water, 12.3 g (0.052 mol) of nickel chloride hexahydrate, 10.3 g (0.052 mol) of manganese chloride tetrahydrate and 12.3 g (0.052 mol) of cobalt chloride hexahydrate were dissolved, and then the solution thus obtained was further diluted with purified water to 58 ml to prepare the solution A.

Preparation of Solution B

In purified water, 68 g (0.81 mol) of sodium hydrogen carbonate was dissolved, and the solution thus obtained was further diluted with purified water to 850 ml to prepare the solution B.

The compositions of these solutions were as follows.
Solution A: Ni: 0.9 mol/L, Mn: 0.9 mol/L, Co: 0.9 mol/L, Cl: 5.4 mol/L
Solution B: $CO_3$: 0.95 mol/L, Na: 0.95 mol/L In a 2-L reaction vessel, 20 ml of purified water was placed, and while the reaction solution temperature was being maintained at 80° C. and the reaction solution was being stirred at 1200 rpm, the total amount of the solution A and the total amount of the solution B were simultaneously added dropwise into the reaction vessel by using pumps, each at a constant rate, over a period of 8 hours. It is to be noted that the reaction was conducted without allowing the reaction solution to overflow. After the completion of the dropwise addition, solid-liquid separation was conducted in the usual manner, and the collected product was dried at 50° C. for 12 hours and lightly pulverized to yield 17.7 g of a powder product (yield: 96%). The thus obtained powder product was subjected to an XRD measurement and an ICP measurement to reveal that the powder product was a composite carbonate that contained nickel, manganese and cobalt in a molar ratio of 1.00:1.01:0.98.

Comparative Example 2

Preparation of Solution A

In purified water, 60.0 g (0.23 mol) of nickel sulfate hexahydrate, 117.0 g (0.69 mol) of manganese sulfate tetrahydrate and 64.5 g (0.23 mol) of cobalt sulfate hexahydrate were dissolved, and then the solution thus obtained was further diluted with purified water to 500 ml to prepare the solution A. In the solution A, the molar ratio, in terms of atom, between the Ni ions, the Mn ions and the Co ions is 0.20:0.60:0.20 in the Ni:Mn:Co molar ratio.

Preparation of Solution B

In purified water, 107.5 g (1.36 mol) of ammonium hydrogen carbonate was dissolved, 83.5 mL of concentrated aqueous ammonia was further added, and then the solution thus obtained was further diluted with purified water to 500 mL to prepare the solution B.

The compositions of these solutions were as follows.
Solution A: Ni: 0.46 mol/L, Mn: 1.38 mol/L, Co: 0.46 mol/L Solution B: $CO_3$: 2.72 mol/L In a 3-L reaction vessel, 75 ml of purified water was placed, and while the reaction solution temperature was being maintained at 43° C. and the reaction solution was being stirred at 1200 rpm, the total amount of the solution A and the total amount of the solution B were alternately added dropwise into the reaction vessel over a period of 10 hours. Specifically, the dropwise addition of the solution A and the dropwise addition of the solution B were alternately conducted so as for the pH of the reaction solution to be maintained at 7. It is to be noted that the reaction was conducted without allowing the reaction solution to overflow. After the completion of the dropwise addition, the reaction mixture was continuously stirred further for 1 hour at the same temperature to promote the crystal growth. Thereafter, solid-liquid separation was conducted in the usual manner, and the collected product was washed with water and then dried for 24 hours to yield 85.7 g of a powder product (yield: 64%). The thus obtained powder product was subjected to an XRD measurement and an ICP measurement to reveal that the powder product was a composite carbonate that contained nickel, manganese and cobalt in a molar ratio of 1.00:17.14:4.27.

Comparative Example 3

Preparation of Solution A

In purified water, 105.1 g (0.4 mol) of nickel sulfate hexahydrate, 67.6 g (0.4 mol) of manganese sulfate tetrahydrate and 112.4 g (0.4 mol) of cobalt sulfate hexahydrate were dissolved, and then the solution thus obtained was further diluted with purified water to 400 ml to prepare the solution A.

Preparation of Solution B

In purified water, 169.6 g (1.6 mol) of sodium carbonate was dissolved, and the solution thus obtained was further diluted with purified water to 500 mL to prepare the solution B.

The compositions of these solutions were as follows.
Solution A: Ni: 1.0 mol/L, Mn: 1.0 mol/L, Co: 1.0 mol/L Solution B: $CO_3$: 3.2 mol/L In a 2-L reaction vessel, 300 ml of purified water was placed, and while the reaction solution temperature was being maintained at 50° C. and the reaction solution was being stirred at 1200 rpm, the total amount of the solution A and the total amount of the solution B were simultaneously added dropwise into the reaction vessel by using pumps, each at a constant rate, over a period of 6 hours. It is to be noted that the reaction was conducted without allowing the reaction solution to overflow. After the completion of the dropwise addition, solid-liquid separation was conducted in the usual manner, and the collected product was washed with water and then dried to yield 163 g of a powder product (yield: 115%). The thus obtained powder product was subjected to an XRD measurement and an ICP measurement to reveal that the powder product was a composite carbonate that contained nickel, manganese and cobalt in a molar ratio of 1.00:0.97:0.97.

<Evaluation of Physical Properties>

For each of the composite carbonates obtained in Example 1 and Comparative Examples 1 to 3, the average particle size, the BET specific surface area, the tap density and the sphericity were measured, and the results thus obtained are shown in Table 1.

(1) Average Particle Size

The average particle size was obtained by a laser particle size distribution measurement method.

(2) Tap Density

The tap density was obtained on the basis of the apparent density or apparent specific volume method described in JIS-K-5101 as follows: 5 g of a sample was placed in a 5-ml graduated cylinder, the graduated cylinder was set in an automated tap density analyzer (Dual Autotap, manufactured by Yuasa Ionics Co., Ltd.), the sample was tapped 500 times and then the volume of the sample was measured to derive the apparent density as the tap density.

(3) Electron Microscope Observation

An electron micrograph of the composite carbonate obtained in Example 1 is shown in FIG. 1.

TABLE 1

|  | Composition ratio (mol) | | | Average particle size (μm) | BET specific surface area (m$^2$/g) | Tap density (g/ml) |
| --- | --- | --- | --- | --- | --- | --- |
|  | Ni | Mn | Co |  |  |  |
| Example 1 | 1.00 | 1.02 | 0.97 | 23.6 | 86.9 | 1.77 |
| Comparative Example 1 | 1.00 | 1.01 | 0.98 | 4.8 | 58.4 | 1.45 |
| Comparative Example 2 | 1.00 | 17.14 | 4.27 | 7.7 | 40.0 | 1.69 |
| Comparative Example 3 | 1.00 | 0.97 | 0.97 | 4.5 | 187.9 | 1.02 |

Example 2

The composite carbonate obtained in Example 1 and lithium carbonate (average particle size: 4.5 μm) were weighed out in such a way that the ratio (Li/M) of the number of moles of the lithium atoms in lithium carbonate to the total number of moles (M) of the nickel atoms, manganese atoms and cobalt atoms in each of the composite carbonates was 1.03, and each of the composite carbonates was mixed with lithium carbonate sufficiently with a mixer; thus homogeneous mixtures were obtained.

Next, each of the thus obtained mixtures was baked at 800° C. for 10 hours in the atmosphere, then cooled, thereafter pulverized and classified to yield a lithium nickel manganese cobalt composite oxide. The physical properties of each of the thus obtained lithium nickel manganese cobalt composite oxides were measured in the same manner as described above, and the results thus obtained are shown in Table 2.

Comparative Example 4

A commercially offered composite hydroxide that contained nickel atoms, manganese atoms and cobalt atoms in a molar ratio of 1.00:1.01:0.98, and has an average particle size of 10.9 μm, a BET specific surface area of 6.6 m$^2$/g and a tap density of 2.09 g/ml and lithium carbonate (average particle size: 4.5 μm) were weighed out in such a way that the ratio (Li/M) of the number of moles of the lithium atoms in lithium carbonate to the total number of moles (M) of the nickel atoms, manganese atoms and cobalt atoms in the composite hydroxide was 1.03, and the composite hydroxide was mixed with lithium carbonate sufficiently with a mixer; thus homogeneous mixture was obtained.

Next, the thus obtained mixture was baked at 800° C. for 10 hours in the atmosphere, then cooled, thereafter pulverized and classified to yield a lithium nickel manganese cobalt composite oxide. The physical properties of the thus obtained lithium nickel manganese cobalt composite oxide were measured in the same manner as described above, and the results thus obtained are shown in Table 2.

TABLE 2

|  | Type of Ni—Mn—Co raw material used | Average particle size (μm) | BET specific surface area (m$^2$/g) | Tap density (g/ml) |
| --- | --- | --- | --- | --- |
| Example 2 | Example 1 | 20.7 | 8.5 | 1.71 |
| Comparative Example 4 | Commercial composite hydroxide | 11.0 | 0.4 | 2.08 |

<Evaluation of Battery Properties>

(1) Fabrication of a Lithium Secondary Battery

A positive electrode mixture was prepared by mixing together 85% by mass of each of the lithium nickel manganese cobalt composite oxides obtained in Example 2 and Comparative Example 4, 10% by mass of a graphite powder and 5% by mass of polyvinylidene fluoride, and the obtained mixture was dispersed in N-methyl-2-pyrrolidinone to prepare a kneaded paste. An aluminum foil was coated with the obtained kneaded paste, then dried, and punched out by press working to form a disc of mm in diameter, and thus a positive electrode plate was obtained.

Next, a lithium secondary battery was fabricated by using the positive electrode plate, and by using the individual members such as a separator, a negative electrode, a positive electrode, current collector plates, mounting brackets, external terminals and an electrolyte. Among these members, the negative electrode used was a lithium metal foil, and the electrolyte used was an electrolyte prepared by dissolving 1 mol of $LiPF_6$ in 1 liter of a one-to-one kneaded liquid of ethylene carbonate and methyl ethyl carbonate.

(2) Evaluation of Battery Performance

Each of the fabricated lithium secondary batteries was operated at room temperature to evaluate the initial discharge capacity, the initial charge-discharge efficiency and the load property, and the results thus obtained are shown in Table 3.

<Evaluation Methods of Initial Discharge Capacity and Initial Charge-Discharge Efficiency>

Charge-discharge was conducted as follows: under the condition of the constant-current and constant-voltage (CCCV) in relation to the positive electrode, charge was conducted at 1.0 C over a period of 5 hours up to 4.3 V, and thereafter, discharge was conducted at a discharge rate of 0.2 C down to 2.7 V. The initial discharge capacity and the initial charge-discharge efficiency were measured. The results thus obtained are shown in Table 3. It is to be noted that the initial charge-discharge efficiency was obtained on the basis of the following calculation formula:

Initial charge-discharge efficiency (%)=[(initial discharge capacity)/(initial charge capacity)]×100

<Evaluation of Load Property>

Each of the fabricated lithium secondary batteries was operated at room temperature to evaluate the load property. First, charge-discharge was conducted as follows: under the condition of the constant-current and constant-voltage (CCCV) in relation to the positive electrode, charge was conducted at 0.5 C over a period of 5 hours up to 4.3 V, and thereafter, discharge was conducted at a discharge rate of 0.2 C down to 2.7 V. A set of these operations was defined as one cycle. Every cycle, the discharge capacity was measured. This cycle was repeated three times, and the arithmetic average of the three discharge capacity values was derived to be defined as the discharge capacity at 0.2 C.

The above-described operation was also conducted at 2 C to obtain a discharge capacity. From these two discharge capacity values, the discharge capacity ratio of the discharge capacity at 2 C to the discharge capacity at 0.2 C was calculated. The results thus obtained are also shown in Table 3 under the heading of load property. The larger this discharge capacity ratio is, the better the load property.

TABLE 3

| | Initial discharge capacity (mAh/g) | Initial charge-discharge efficiency (%) | Load property |
|---|---|---|---|
| Example 2 | 165 | 93 | 0.88 |
| Comparative Example 4 | 153 | 70 | 0.79 |

What is claimed is:

1. A composite carbonate comprising nickel atoms, manganese atoms and cobalt atoms, and having an average particle size of 20 μm or more and 40 μm or less, a BET specific surface area of 50 to 130 m$^2$/g and a tap density of 1.7 g/ml or more.

2. The composite carbonate according to claim 1,
wherein the ratio between the content of the nickel atoms to the content of the manganese atoms is 1:0.95 to 1.05 in terms of molar ratio and
wherein the ratio of the content of the nickel atoms to the content of the cobalt atoms is 1:0.95 to 1.05 in terms of molar ratio.

* * * * *